UNITED STATES PATENT OFFICE.

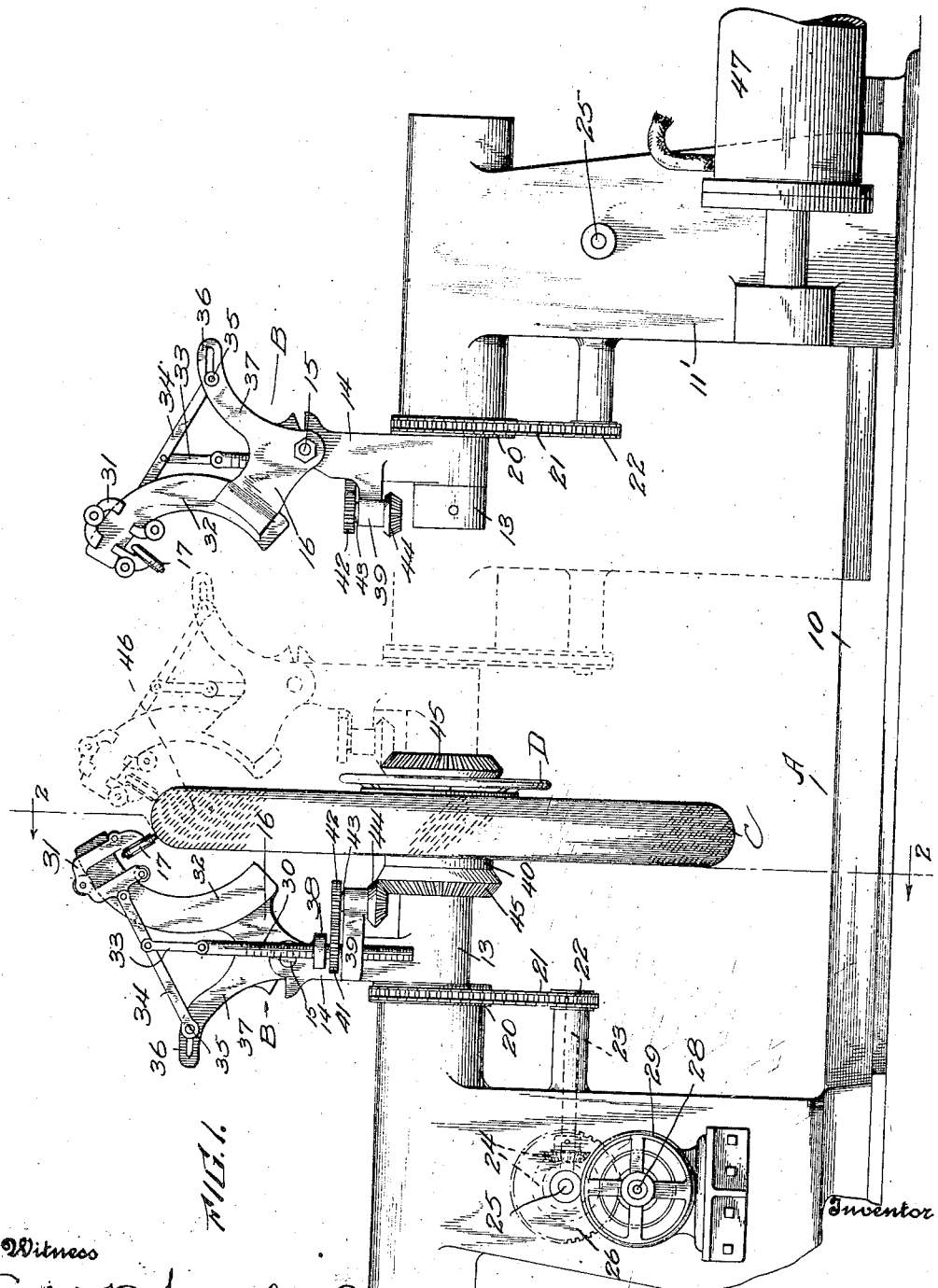

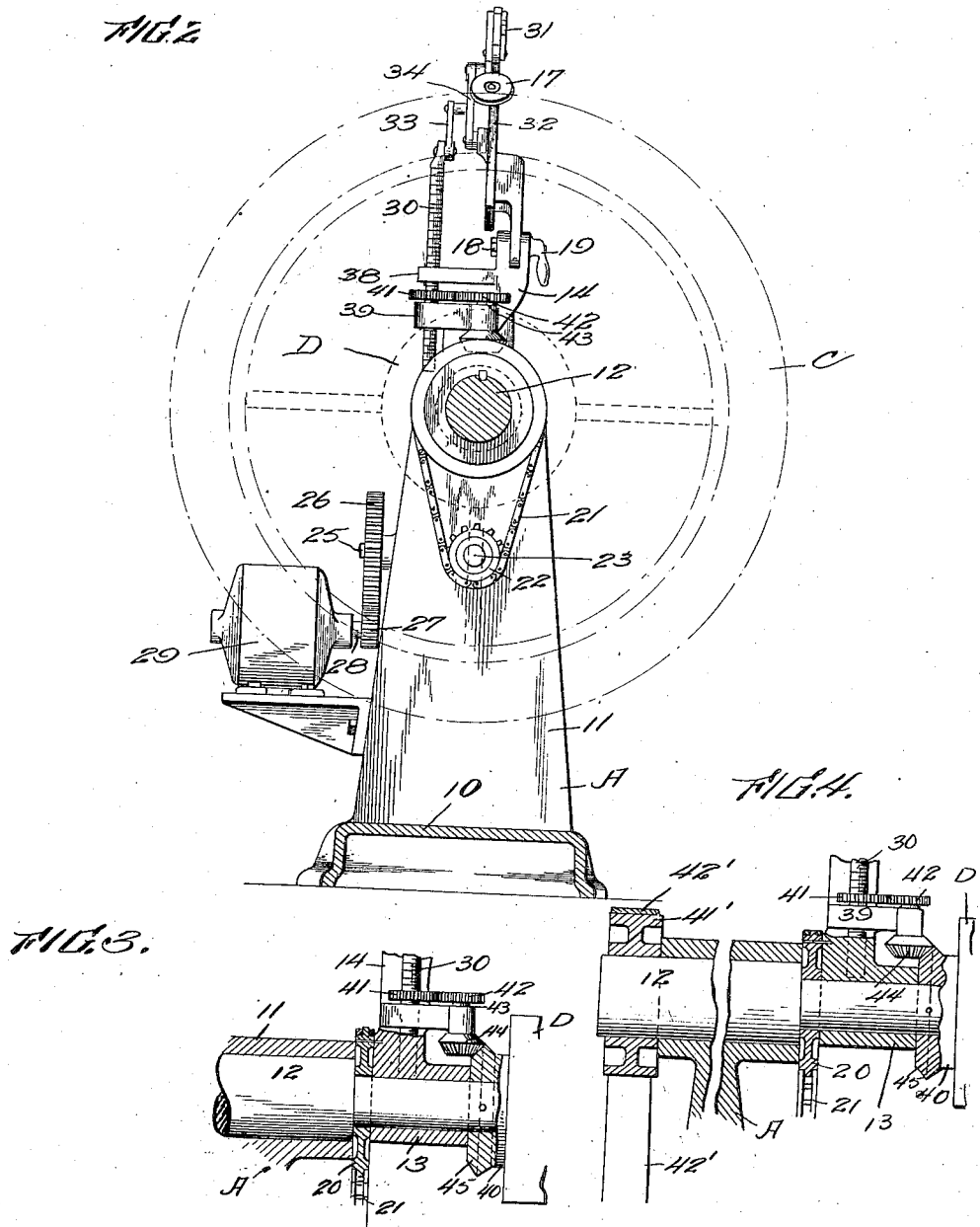

ROLAND S. TROGNER, OF AKRON, OHIO, ASSIGNOR TO THE GOODYEAR TIRE & RUBBER COMPANY, OF AKRON, OHIO, A CORPORATION OF OHIO.

TIRE-MAKING MACHINE.

1,397,154.      Specification of Letters Patent.      Patented Nov. 15, 1921.

Application filed July 20, 1918. Serial No. 245,931.

*To all whom it may concern:*

Be it known that I, ROLAND S. TROGNER, a citizen of the United States, and resident of Akron, Ohio, have invented new and useful Improvements in Tire-Making Machines, of which the following is a specification.

My invention relates to tire construction; more particularly to stitching apparatus for use in fabricating tire carcasses.

One of the principal objects of the invention is to provide an apparatus for simultaneously stitching both sides of a cord tire carcass, and one in which the stitching devices are adapted to operate on the cords lengthwise of the cords so that the cords are not spread apart or disturbed in their normal arrangement relatively to each other.

Another object of the invention is to provide a novel and improved stitching apparatus which is adapted to lay down smoothly and evenly, fabric plies upon a core and in which apparatus the mounting of the stitching unit is such as admits of rotation of the stitching unit as a whole.

A still further object of the invention is to provide means for automatically moving the stitching devices inwardly transversely of the core.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a partly broken elevational view showing my improved stitching apparatus;

Fig. 2 is a cross sectional view taken on the line 2—2 of Fig. 1;

Fig. 3 is a partly broken and sectional view of the stitcher unit sleeve and of parts adjacent to said sleeve; and Fig. 4 is a broken sectional view of a modified construction.

In the drawings, A designates the frame of the apparatus; B designates the stitching unit; C designates the annular core on which a tire carcass is built up; and D designates the chuck on which the core C is mounted.

The frame A preferably consists of the base 10 and the vertical support 11 which is mounted on said base.

A shaft 12 is mounted on the upper part of the support 11 and on said shaft is rotatably mounted the stitching unit B which, in this instance, is arranged laterally of and preferably coaxially with the core C.

As shown, the stitching unit B preferably consists of a sleeve 13 which is rotatably mounted on the shaft 12 and is provided with a projecting extension 14 which latter has at its outer end a pivot 15 to which is connected the inner end of a bracket 16 which carries a stitching roller 17. A winged nut 18 on the pivot 15 can be turned by means of a handle 19 into or out of engagement with the bracket 16 to adjust the position of the stitching roller 17.

The stitching unit B may be rotated by any suitable or approved means; that shown consisting of a sprocket wheel 20 fastened to the sleeve 13 and connected by a chain 21 to the sprocket pinion 22 keyed on a shaft 23 which latter bears in the support 11 and is connected by beveled gears 24 to a shaft 25 which also bears in the support 11 and has keyed thereon a spur wheel 26 in mesh with a pinion 27 carried on a shaft 28 of the motor 29.

The chuck D is preferably mounted on the shaft 12 as shown in the left half of Fig. 1. Said chuck may be of the usual or any improved construction adapted to detachably support the core C.

In order to effect movement of the stitching roller 17 inwardly transversely of the core C, any suitable means may be employed; that shown consisting of a screw 30 which is operatively connected to a carriage 31, which latter carries the stitching device or roller 17 and is movably mounted on a curved guide 32 forming part of the bracket 16. To the outer end of the screw 30 is pivotally connected one end of a link 33, which has its other end pivotally connected to a lever 34 which latter has one end thereof pivotally connected to the carriage 31 and has on its other end a pin 35, which extends into the guide slot 36 provided in an arm 37 cast integral with the bracket 16. The screw 30 is mounted in a pair of projections or lugs 38 and 39 projecting from the extension 14 of the sleeve 13, and said screw is preferably operatively connected to a hub 40 of the chuck D by means of a spur wheel 41, fastened to the screw 30, which meshes with a spur wheel 42 on one end of a shaft 43 mounted in the lug 39 and has keyed thereon a bevel pinion 44 which meshes with a bevel gear 45 on the hub 40 of the chuck D carried on the shaft 12.

In the construction shown in Figs. 1, 2 and 3, the shaft 12 is mounted fast on the support 11 so that the core C remains stationary while the stitching unit B is rotated.

In the modified construction shown in Fig. 4, the shaft 12' is rotatably mounted on the support 11, and said shaft has fast thereon a pulley 41' driven by a belt 42' so that the core C can be rotated at the same time that the stitching unit B is rotated.

In order to stitch both sides of the fabric ply 46 without changing the position of the core C on the chuck D, there is provided another support 11' which is movably mounted on the base 10 and carries a stitching unit similar in construction and operation to the stitching unit B already described, see Fig. 1. The support 11' can be moved toward or away from the core C by means of a hydraulic ram indicated at 47 or other suitable means not shown.

From the foregoing detailed description of the construction and operation of the stitching apparatus, it will be seen that by adjustment of the bracket 16 the stitching device 17 can be adjusted in position for work on different sizes of tire carcasses. Also, it will be seen that when the motor 29 is operated it effects rotation of the stitching unit B through the instrumentality of the operative connection between the motor 29 and the sleeve 13.

When the stitching unit B is rotated the stitching device 17 is moved circumferentially of the core C and acts to lay down on the core or tire carcass the fabric 46; said stitching device 17 (during the rotation of the stitching unit B) being automatically moved inwardly transversely of the core C.

The stitching apparatus is particularly well adapted for working on cord tire carcasses for the reason that both stitching units can be operated to have the stitching device 17 move against the cords 46', (which usually make an angle of 45 degrees with the side edges of the ply) in such manner that they do not spread the cords apart, or act to disturb the desired arrangement of the cords relatively to each other in laying down the ply.

What I claim is:

1. An apparatus for stitching fabric on a tire carcass, comprising the combination with a core-receiving chuck of a rotatable sleeve mounted coaxially with the chuck, a stitching device carried by said sleeve, and means for automatically moving said stitching device inwardly transversely of a tire carcass being formed upon a core carried by the chuck.

2. An apparatus for stitching fabric on a tire carcass, comprising the combination of a rotatably mounted sleeve, a bracket on said sleeve, a stitching device on said bracket, and automatic means for moving said stitching device inwardly and radially of said rotatably mounted sleeve.

3. An apparatus for stitching fabric on a tire carcass, comprising the combination of a rotatable sleeve mounted coaxially with the chuck, a bracket on said sleeve, a stitching device adjustable on said bracket, automatic means for moving said stitching device inwardly over the side of a tire carcass being formed on a core carried by the chuck and means to drive said sleeve, whereby the stitchers are moved circumferentially around the carcass.

4. In a stitching apparatus, the combination of an adjustably mounted stitching device, a chuck, and automatic means between said chuck and said stitching device for adjusting the stitching device with respect to a core carried by the chuck.

5. In a stitching apparatus, the combination of a sleeve, a stitching device adjustably mounted on said sleeve, means to rotate said sleeve, a chuck, and power driven means operatively connected to said chuck for adjusting said stitching device.

6. In a stitching apparatus, the combination of a shaft, a chuck on said shaft, a rotatable sleeve on said shaft, and a stitching device carried by said sleeve and adjustable radially with respect to the sleeve.

7. In a stitching apparatus, the combination of a shaft, a chuck on said shaft, a rotatable sleeve on said shaft, a stitching device carried by said sleeve, and means operatively connected to said chuck for moving said stitching device toward and away from said sleeve.

8. In a stitching apparatus, the combination of a shaft, a chuck on said shaft, a rotatable sleeve on said shaft, a stitching device adjustably carried by said sleeve, power driven means for moving said stitcher device toward and away from said sleeve, and means to drive said sleeve.

9. In a stitching apparatus, the combination of an adjustably mounted stitching device, a chuck power driven, means operatively connected to said chuck for adjusting the stitching device toward and away from the same, and means to rotate said stitching device.

10. In a stitching apparatus, the combination of a shaft, a chuck on said shaft, an adjustably mounted stitching device carried by said shaft, a support movable laterally toward or away from said chuck, and a stitching device carried by said support.

11. In a stitching apparatus, the combination of a shaft, a chuck on said shaft, an adjustably mounted stitching device carried by said shaft, a support movable laterally toward or away from said chuck, and a stitching unit rotatably mounted on said support, and movable radially of said shaft.

12. In a stitching apparatus, the combination of a shaft, a chuck on said shaft, a rotatable sleeve on said shaft, a swingably mounted bracket on said sleeve, a stitching device carried by the bracket and means operatively connected to said chuck for adjusting said stitching device radially and axially of said shaft.

13. In a stitching apparatus, the combination of a shaft, a core chuck on said shaft, a rotatable sleeve on said shaft, a swingably mounted bracket on said sleeve, a stitching device carried by said bracket, means operatively connected to said chuck for adjusting said stitching device, means to drive said sleeve, a support movable laterally toward or away from said chuck, and a stitching unit rotatably mounted on said support.

14. A tire carcass making machine including a core support, a stitcher member, means supporting the stitcher and movable to permit travel of the stitcher in a circular path around the core, and automatic means operable for drawing the stitcher inwardly toward the core support as the stitcher revolves in its circular path.

15. A tire carcass making machine including a core support, a stitcher member for stitching plies of fabric on to a core mounted on the core support, and automatic means operable for moving the stitcher member around the core in a helical path.

16. A machine for building tire carcasses comprising, an axially mounted core chuck, stitcher supporting elements mounted for rotation about the core axis and adjacent the sides of the core chuck, stitchers carried upon said supporting elements, means for rotating the stitcher supporting elements about the core axis, and means for moving one of the stitcher supporting elements axially of said core chuck.

17. A machine for building tire carcasses comprising, an axially mounted core chuck, stitcher supporting elements mounted for rotation about the chuck axis and adjacent the sides of the core chuck, stitchers movable upon said supporting elements, means for rotating the stitcher supporting elements about the core axis, means for moving the stitcher upon the supporting elements in a direction substantially radial of the core chuck, and means for moving one of the stitcher supporting arms axially of the core chuck.

18. A machine for building tire carcasses comprising, an axially mounted chuck for supporting an annular tire-core, stitcher supporting elements rotatable about the core axis and adjacent each side of said chuck, stitchers adjustably mounted upon said stitcher supporting elements, power driven means for moving the stitchers transversely of the core annulus, means for rotating the stitcher supporting elements about the core axis, and means for moving one of the stitcher elements axially of the chuck.

19. A machine for building tire carcasses comprising, an axially mounted core chuck, stitcher supporting elements mounted for rotation about the core axis and adjacent each side of the core chuck, stitchers adjustable upon said supporting elements, means for rotating the supporting elements about the core axis, means for rotating the core chuck, and means for moving one of the stitcher supporting elements axially of the core chuck.

20. A machine for building tire carcasses comprising in combination an axially mounted core chuck, a stitcher supporting element mounted on each side of said core chuck, stitchers adjustably carried by said supporting elements, means for rotating said supporting elements about said core axis, and means for adjusting one of said supporting elements independently of the other.

21. A machine for building tire carcasses comprising means for supporting a core, a plurality of stitcher elements mounted for independent rotation about the core and means for moving one of the stitcher elements to an inoperative position with respect to the core.

22. A machine for building tire carcasses comprising means for rotatably supporting a core, a plurality of stitcher elements mounted at opposite sides of the core for independent rotation and means for laterally moving one of the stitchers to an inoperative position with respect to the core.

23. A machine for building tire carcasses comprising means for rotatably supporting a core, means for rotating the core, a plurality of stitcher elements mounted for independent rotation about opposite sides of the core and means for selectively rotating the stitcher elements.

24. A machine for building tire carcasses comprising means for supporting a core, stitcher elements mounted at opposite sides of the core and means for independently rotating the stitcher elements about the core.

In witness whereof, I have hereunto signed my name in the presence of two subscribing witnesses.

ROLAND S. TROGNER.

Witnesses:
 A. H. LIDDERS,
 E. C. LEADENHAM.